No. 628,877. Patented July 11, 1899.
D. H. WALSH.
CANE CARRIER AND FEEDER.
(Application filed Mar. 1, 1899.)
(No Model.)
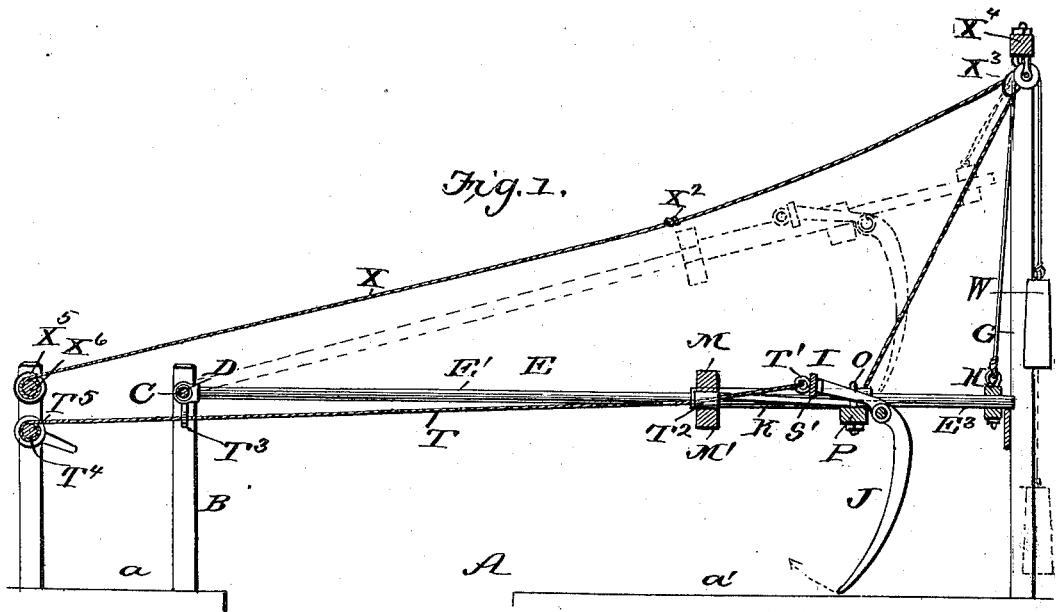
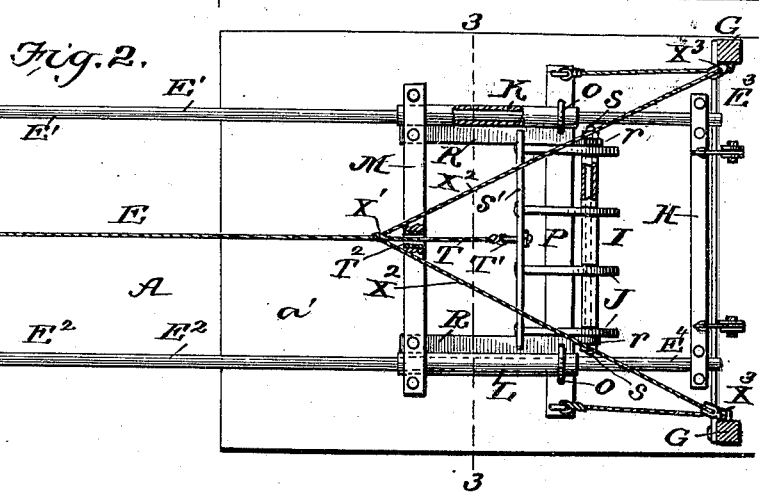
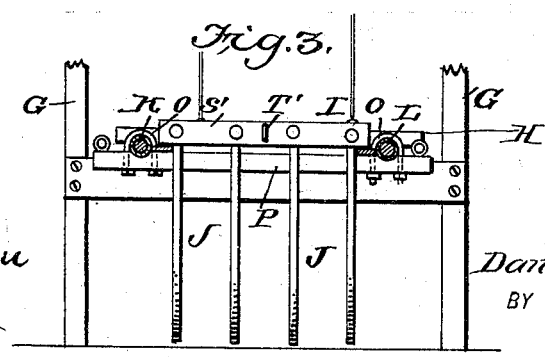
WITNESSES:
Jos. A. Ryau
F. S. Stitt
INVENTOR
Daniel H. Walsh
BY Munn & Co.
ATTORNEYS.

United States Patent Office.

DANIEL HICKY WALSH, OF PLAQUEMINE, LOUISIANA.

CANE CARRIER AND FEEDER.

SPECIFICATION forming part of Letters Patent No. 628,877, dated July 11, 1899.

Application filed March 1, 1899. Serial No. 707,326. (No model.)

*To all whom it may concern:*

Be it known that I, DANIEL HICKY WALSH, of Plaquemine, in the parish of Iberville and State of Louisiana, have invented a new and useful Improvement in Cane Carriers and Feeders, of which the following is a specification.

My invention relates to apparatus for removing cane or other tangled material from cars, carts, or other conveyances and delivering or depositing it in carriers or conveyers; and it has for its object a rake for such purpose which shall be of comparatively few parts and simple and efficient in operation.

With this end in view my invention consists of a supporting guide-frame along which the rake-frame is fitted to slide, the said guide-frame being mounted upon supports in such a manner that it may be moved laterally to accommodate the rake to the width of the cane-pile and swing in a vertical plane about one end, so as to enable the rake proper to be lifted, if necessary, over the cane or the like in its reverse movement.

The invention also consists in certain features of construction and arrangement of the parts, which I shall first describe and then point out the novel features in the appended claims.

Reference is to be had to the accompanying drawings, forming part of this specification, in which like characters of reference are applied to corresponding parts throughout the views.

Figure 1 is a longitudinal section of my improved cane-rake, the guide-frame being shown in normal position in full lines and in elevated position in dotted lines. Fig. 2 is a plan view of the rake, and Fig. 3 is a transverse vertical section on the line 3 3 of Fig. 2.

Upon one section $a$ of the platform A are two posts B, joined near their upper ends by a rod C. A sleeve D is fitted to turn and slide from side to side on the said rod C, and held on the ends of the sleeve by T-couplings is the guide-frame E, consisting of two rods $E'$ $E^2$, which extend across the space E for the conveyer or carrier and whose free ends $E^3$ $E^4$ normally rest upon a stop-bar extending between the upright standards G G', mounted upon the other section $a'$ of the platform and at or near the rear end of the same. The free ends of the rods $E'$ $E^2$ are rigidly connected by braces H, bolted or held together in any suitable manner. These rods $E'$ $E^2$, as stated above, form a guide-frame, upon which I mount the rake-frame I and rake proper, J, in the following manner.

Two sleeves (designated K and L) are fitted to slide upon the rods $E'$ and $E^2$, and braces M M' are fastened one on the top and the other on the bottom of the sleeves, at one end thereof, by bolts or the like. Near the other end of the said sleeves K L straps O are located, of substantially U shape, with their ends extending downwardly. Secured to the sleeves K L by means of these straps is a cross-bar P, extending from one sleeve to the other and beyond the guide-frame E, on each side thereof, and a bar R extends along the inner side of each sleeve K and L from the cross-bar P to and between the braces M M', being secured in place at one end by a member of the straps and at the other end by a bolt of the braces M M'.

An extension $r$ is formed on each bar R, and in such extensions the spindle $s$ of the rake proper, J, is journaled. As will be seen from Fig. 2, the rake proper consists of a plurality of curved teeth pivoted between their ends on the spindle $s$ and having their upper ends connected together by the plate $s'$, whose ends extend over the bars R, whereby to limit the movement of the rake proper, J, on the spindle $s$ in one direction. The tilting of the rake upward is limited by the teeth contacting with the cross-bar P.

In order to reciprocate the rake on the guide-frame E, I provide a cable T, attached by one end to an eye T' to the plate $s'$ of the rake, the cable passing through a guide $T^2$, held between the braces M M', through a second guide $T^3$, depending from the sleeve D and preferably around a drum $T^4$ on the shaft $T^5$. The said cable being wound upon said drum draws the rake in the direction of the carrier or conveyer. To reverse the movement of the rake, I employ a second cable X, branched at X' and each branch $X^2$ passing over a pulley $X^3$, secured to a cross-bar $X^4$, and being secured to an eye on the end of the cross-bar P of the rake-frame. The other end of the cable X is adapted to be wound upon a drum $X^5$ on the shaft $X^6$.

From the foregoing description it will be seen that the rake proper is reciprocated by alternately hauling upon the cables T and X. A direct pull is given on the rake, which keeps the lower ends of the rake-teeth in thoroughly operative position without unnecessary strain upon the rake-frame and guides.

It is to be understood that my improved rake is designed to rake cane or other tangled or loose material from platforms on which it may have been dumped or thrown out of carts or wagons into conveyers of any desired description and also that it is designed to be used in the reversal of the purpose described above—that is, to rake the cane directly from railway-cars into wagons or other conveyances. In the first instance the cane is dumped upon the platform-section $a'$, the cable X having been previously pulled upon until the guide-frame E is swung on its pivot and raised to the position shown in dotted lines in Fig. 1, and then the cable is let out until the rake-frame and guide-frame rest against the load. The rake is then reciprocated by means of the cables and rakes quantities of cane off the platform-section $a'$ into any suitable conveyer (not shown) which had been moved up between the two sections of the platform, or if it be desired to rake the cane from railway-cars into suitable conveyers the section $a'$ of the platform is done away with and not used, but the car is moved up under the rake, a side of the car is taken off or let down, and the rake is reciprocated, raking the cane from the car directly to the conveyer drawn up alongside the same. It will be observed that in its reverse movement the rake-teeth will not only pass freely over the pile by reason of their being tiltable, but the entire guide and rake frame may be lifted over the pile by the cable X by reason of the height of the pulleys $X^3$ above the free ends of the guide-frame and the pivotal connection the latter has with the rod C, also that the rake-frame can work at any angle. In case the load is wider than the rake the guide-frame can be moved laterally on the rod C, so as to accommodate itself to the load. This lateral shifting may be done by hand-power or other suitable means.

I wish it understood that I do not limit myself to the winding-drums shown for the means of alternately drawing the cables, also that when the drums are used the shafts thereof need not be operated by the handles shown, but by a motor of any description, and I also wish it understood that the rake is to be non-tiltable, when desired.

In order to rest the rake-frame at different elevations or operate the same at different angles, I provide chains connected at one end to the cross-bar H thereof and run over pulleys on the overhead beams or cross-bar $x^4$, the other ends of the chains being secured to counterweights W.

Having thus described my invention, what I claim as new, and desire to secure by Letters Patent, is—

1. A cane carrier and feeder, comprising a guide-frame which is pivoted to swing in a vertical plane, and a rake-carrying frame mounted to reciprocate upon such guide-frame, substantially as set forth.

2. A cane carrier and feeder, comprising a guide-frame mounted to swing in a vertical plane and movable laterally, and a rake-carrying frame fitted to reciprocate on said guide-frame, substantially as set forth.

3. A cane carrier and feeder, comprising a guide-frame having parallel rods, a rake-carrying frame having sleeves which receive and slide upon said rods, and cables attached to the rake-carrying frame and working over guides whereby to reciprocate said rake-frame, as set forth.

4. In a cane carrier and feeder, the combination with a support, of a guide-frame mounted to swing in a vertical plane upon said support and movable laterally thereon, a rake-carrying frame mounted to reciprocate on said guide-frame, means for moving said rake-carrying frame in a positive direction whereby to rake the material into a carrier or the like, and a cable connected with said frame, the said cable when pulled upon reversing the movement of the said frame and raising the free end of the guide-frame whereby to free the rake from the material, as set forth.

5. In a cane carrier and feeder, the combination of the guide-frame mounted to swing in a vertical plane, a rake-carrying frame movable reciprocally upon said guide-frame and means for pulling said rake-frame in a backward direction and raising the guide-frame, as set forth.

6. In a cane carrier and feeder, the combination with a support, of a guide-frame mounted to swing in a vertical plane on said support and movable laterally thereon a rest for the free end of said frame, a rake-carrying frame mounted to reciprocate on said guide-frame, a tiltable rake mounted on said rake-frame, means for drawing the rake-frame forward, and means for drawing said rake-frame backward and raising the free end of the guide-frame off its rest, as set forth.

7. In a cane carrier and feeder, the combination with the guide-frame of the reciprocating rake-carrying frame, said frame consisting of sleeves fitted on said guide-frame, a cross-bar connected with and extending between said sleeves, bars extending alongside of each sleeve and each formed with an extension, a spindle journaled in said extensions, a plurality of rake-teeth pivoted between their ends on said spindle, and a plate connecting the upper ends of said rake-teeth and engaging with the bars alongside the sleeves whereby to limit the movement of the teeth in one direction, as set forth.

8. In a cane carrier and feeder, a support, a sleeve fitted on said support and rotatable and movable laterally thereon, a guide-frame formed of two parallel rods having one end secured to said sleeve, a rake-carrying frame movable on said rods, and means for reciprocating said rake-carrying frame and raising the same in its backward movement, as set forth.

9. In a cane carrier and feeder, the combination with the guide-frame mounted to swing in a vertical plane, a rake-carrying frame mounted to reciprocate on said guide-frame, a rest for the free end of said guide-frame, a pulley held above said rest, and a cable connected with said rake-carrying frame and passing over said pulley, as set forth.

DANIEL HICKY WALSH.

Witnesses:
A. A. BROWNE,
THEO. H. BRODÉ.